(12) United States Patent
Hosur (10) Patent No.: US 10,999,347 B2
(45) Date of Patent: *May 4, 2021

(54) METHOD AND APPARATUS FOR DELIVERING MEDIA CONTENT UTILIZING SEGMENT AND PACKAGING INFORMATION

(71) Applicant: AT&T Intellectual Property I, L.P., Atlanta, GA (US)

(72) Inventor: Prabhudev Hosur, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/429,226

(22) Filed: Jun. 3, 2019

(65) Prior Publication Data

US 2019/0356720 A1 Nov. 21, 2019

Related U.S. Application Data

(63) Continuation of application No. 15/696,903, filed on Sep. 6, 2017, now Pat. No. 10,362,088, which is a continuation of application No. 14/453,216, filed on Aug. 6, 2014, now Pat. No. 9,787,751.

(51) Int. Cl.
*H04L 29/08* (2006.01)
*H04L 29/06* (2006.01)

(52) U.S. Cl.
CPC .......... *H04L 67/02* (2013.01); *H04L 65/4076* (2013.01); *H04L 65/602* (2013.01); *H04L 65/605* (2013.01); *H04L 65/607* (2013.01); *H04L 65/608* (2013.01)

(58) Field of Classification Search
None
See application file for complete search history.

(56) References Cited

U.S. PATENT DOCUMENTS

| | | | |
|---|---|---|---|
| 8,451,929 B2 | 5/2013 | Agee et al. |
| 8,532,171 B1 | 9/2013 | Narayanan et al. |
| 8,572,271 B2 | 10/2013 | Raveendran |
| 8,683,542 B1 | 3/2014 | Henry |

(Continued)

FOREIGN PATENT DOCUMENTS

| | | |
|---|---|---|
| EP | 2640082 A1 | 9/2013 |
| KR | 20130058648 | 4/2013 |
| WO | 2014026988 A1 | 2/2014 |

OTHER PUBLICATIONS

Concolato, et al., "Live HTTP streaming of video and subtitles within a browser," Proceedings of the 4th ACM Multimedia Systems Conference, MMSys '13, 2013, p. 146-150.

(Continued)

*Primary Examiner* — Brian Whipple
(74) *Attorney, Agent, or Firm* — Guntin & Gust, PLC; Mark Wilinski (57) ABSTRACT

Aspects of the subject disclosure may include, for example, receiving multicast multi-bitrate streams that include segment and packaging information for media content where the segment and packaging information includes fragment start and end boundary point markers for the media content, generating an adaptive bitrate stream for the media content according to the segment and packaging information, and providing the adaptive bitrate stream to an end user device via unicast. Other embodiments are disclosed.

20 Claims, 8 Drawing Sheets

(56) References Cited

U.S. PATENT DOCUMENTS

| | | |
|---|---|---|
| 8,694,669 B2 | 4/2014 | Park et al. |
| 9,124,642 B2 | 9/2015 | Choudhury et al. |
| 2003/0076369 A1 | 4/2003 | Resner et al. |
| 2010/0146139 A1 | 6/2010 | Brockmann |
| 2012/0042091 A1 | 2/2012 | McCarthy et al. |
| 2012/0282951 A1 | 11/2012 | Nguyen et al. |
| 2012/0314026 A1 | 12/2012 | Chen et al. |
| 2013/0013803 A1 | 1/2013 | Bichot et al. |
| 2013/0089142 A1 | 4/2013 | Begen et al. |
| 2013/0091521 A1 | 4/2013 | Phillips et al. |
| 2013/0170561 A1 | 7/2013 | Hannuksela |
| 2013/0179588 A1 | 7/2013 | McCarthy et al. |
| 2013/0195203 A1 | 8/2013 | Syed et al. |
| 2013/0254634 A1 | 9/2013 | Luby et al. |
| 2013/0290555 A1 | 10/2013 | Einarsson et al. |
| 2013/0291040 A1 | 10/2013 | Rhyu et al. |
| 2014/0019593 A1 | 1/2014 | Reznik et al. |
| 2014/0019635 A1 | 1/2014 | Reznik et al. |
| 2014/0068690 A1 | 3/2014 | Luthra et al. |
| 2014/0075042 A1 | 3/2014 | Giladi |
| 2014/0095668 A1 | 4/2014 | Oyman |
| 2014/0137162 A1 | 5/2014 | McNamee et al. |
| 2014/0137168 A1 | 5/2014 | Takahashi et al. |
| 2014/0149591 A1 | 5/2014 | Bhattacharya et al. |
| 2014/0156800 A1 | 6/2014 | Falvo et al. |
| 2014/0201324 A1 | 7/2014 | Zhang et al. |
| 2014/0258505 A1 | 9/2014 | Liao et al. |
| 2015/0149591 A1 | 5/2015 | Gibbon et al. |
| 2015/0180924 A1 | 6/2015 | O'Callaghan |
| 2015/0288593 A1 | 10/2015 | Campbell |
| 2016/0277474 A1 | 9/2016 | Ljung et al. |
| 2017/0374127 A1 | 12/2017 | Hosur |
| 2018/0063219 A1 | 3/2018 | Ljung et al. |

OTHER PUBLICATIONS

He, et al., "Dynamic scheduling on video transcoding for MPEG DASH in the cloud environment," Proceedings of the 5th ACM Multimedia Systems Conference, MMSys '14, 2014, p. 283-294.

Kupka, et al., "An evaluation of live adaptive HTTP segment streaming request strategies," IEEE Conference on Local Computer Networks (LCN), Oct. 4-7, 2011, p. 604-612.

Kwan, et al., "Demonstration of a multimedia player supporting the MPEG-DASH protocol," IEEE Visual Communications and Image Processing (VCIP), Nov. 27-30, 2012.

Lazic, et al., "One Implementation of adaptive streaming over HTTP on Android DTV platform," IEEE International Conference on Consumer Electronics, Sep. 3-5, 2012, p. 282-284.

Lohmar, et al., "Dynamic adaptive HTTP streaming of live content," IEEE International Symposium on World of Wireless, Mobile and Multimedia Networks (WoWMoM), Jun. 20-24, 2011, p. 1-8.

Sodagar, Iraj, "The MPEG-DASH standard for multimedia streaming over the Internet," IEEE Multimedia (Apr. 2011) 18(4):62-67.

Swaminathan, et al., "Low latency live video streaming using HTTP chunked encoding," IEEE International Workshop on Multimedia Signal Processing (MMSP), Oct. 17-19, 2011, p. 1-6.

Thang, et al., "Adaptive streaming of audiovisual content using MPEG DASH," IEEE Transactions on Consumer Electronics (Feb. 2012) 58(1):78-85.

Timmerer, et al., "Dynamic adaptive streaming over HTTP: from content creation to consumption," Proceedings of the 20th ACM International Conference on Multimedia, MM '12, 2012, p. 1533-1534.

FIG.8

METHOD AND APPARATUS FOR DELIVERING MEDIA CONTENT UTILIZING SEGMENT AND PACKAGING INFORMATION

CROSS REFERENCE TO RELATED APPLICATIONS

This application is a Continuation of U.S. patent application Ser. No. 15/696,903 filed Sep. 6, 2017, which is a Continuation of U.S. patent application Ser. No. 14/453,216 filed Aug. 6, 2014 (now U.S. Pat. No. 9,787,751). All sections of the aforementioned application(s) and patent(s) are incorporated herein by reference in their entirety.

FIELD OF THE DISCLOSURE

The subject disclosure relates to a method and apparatus for delivering media content utilizing segment and packaging information.

BACKGROUND

Users often desire to have access to a variety of media services, including voice, video, data and/or messaging. Users also desire to have access to these media services by way of multiple end user devices.

Users often desire a particular level of quality of the service, without regard to the type of end user device such as a set top box or a mobile phone. The quality of service can be affected by a number of different conditions, including the delivery techniques, the network traffic, the type of media service, the type of end user device, and so forth.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for methods and systems to support both interactive television (e.g., Internet Protocol Television (IPTV), cable television, satellite television, and so forth) and Over-The-Top Television (OTT-TV) through use of Segment and Packaging Information (SPI). The SPI can include any one of the following forms depending on the implementation specific to a targeted end-user device type: (a) playlist file of HyperText Transfer Protocol (HTTP) Live streaming (HLS), (b) manifest file of HTTP Smooth Streaming (HSS) or (c) Media Presentation Description (MPD) file of Dynamic Adaptive Streaming over HTTP (DASH). SPI can also be different from MPD/Playlist/Manifest, but includes all the information or more information than that which is present in MPD/Playlist/Manifest. The systems and methods can deliver various types of media services (e.g., video, data, voice, messaging, and so forth). One or more of the exemplary embodiments can employ Fragment Live Streaming (FLS) which is a technique of sending MPEG-2 transport stream fragments over multicast along with the SPI. In one or more embodiments, FLS can enable the creation of a packaged unicast stream at a remote end using two operations on the FLS stream: (a) extraction of the SPI from the FLS stream to write playlist/manifest/MPD files and (b) segmentation of the stream with the help of Encoder Boundary Point (EBP) markers in the FLS stream to write the media segments. In one or more embodiments, FLS can provide backward compatibility with existing set top box(es) (STB(s)). For example, the existing STBs can be able to receive the multicast FLS transport streams containing the SPI and can ignore the SPI, while decoding the rest of the stream and presenting the media content of the stream. In one or more embodiments, existing STB(s) can be updated with hardware and/or software to enable STB-based complex targeted ad insertion utilizing the SPI in the FLS transport streams. This complex targeted ad insertion can be via playlist/MPD/Manifest manipulation, or by segment substitution or by elementary stream substitution. The EBP markers are utilized and their utilization in FLS techniques for delivering media content can include features described by OC-SP-EBP-101-130118 IETF RFC-2250 and TR101-290 specifications, the disclosures of which are hereby incorporated by reference.

In one or more embodiments, the FLS technique centralizes information generation and processing for advertising and black-outs in the transcoders. Thereby, FLS provides a method: (a) to implement all the advertisement and blackout related information generation and stream conditioning for both interactive television and OTT-TV in the transcoders and (b) to avoid the work done in the transcoder for information generation and stream conditioning being duplicated in the packager to relieve the packager of this burden and to increase the packager's efficiency and scale for processing more streams.

One or more aspects of the subject disclosure include a Multi-BitRate (MBR) video multicast being transmitted to equipment located at a network edge or other network location (e.g., intermediate offices or central offices). The multicast streams can then be converted to or otherwise utilized to generate unicast Adaptive BitRate (ABR) streams (e.g., at the equipment at edge) to serve end-user devices (e.g., mobile phones, personal computers, tablets, and so forth) over the Internet and/or over a Content Distribution Network (CDN). In one or more embodiments, one of the multicast streams can be selected (e.g., according to a highest bit rate stream) and can be transmitted over the interactive network (e.g., IPTV, cable, and/or satellite network) to media processors, such as set top boxes (STBs).

In one or more embodiments, SPI (e.g., MPD, DASH-MPD, Playlist, Manifest and so forth) can be generated in a transcoder. In one embodiment, the SPI can be embedded as a separate Program ID (PID) in a transport stream. In one embodiment, an SPI program can be created in the transport stream as a constant bit rate stream. In one embodiment, some or all of the SPI can be included in a Real-time Transport Protocol (RTP) header extension outside of the transport stream. In one embodiment, the SPI can be transported as a separate single program transport stream. In one embodiment, the SPI, which can be included inside and/or outside of the transport stream for the media content, enables identification of the chunk boundaries for the media content. One or more of the exemplary embodiments can be utilized with FLS standards so as to be FLS streams that are standard compliant. One or more of the exemplary embodiments can create unicast streams (e.g., DASH-TS, HLS, and/or HSS) from FLS streams. One or more of the exemplary embodiments can enable STBs to present content from FLS streams.

One embodiment of the subject disclosure is a method that includes generating, by a system including a processor, segment and packaging information for media content, where the segment and packaging information includes fragment start and end boundary point markers for the media content. The method can include generating, by the system, multicast multi-bitrate streams for delivery of the media content and the segment and packaging information. The method can include providing, by the system, the multicast multi-bitrate streams to a server to enable the server to generate an adaptive bitrate stream for the media content according to the segment and packaging information and to enable the server to provide the adaptive bitrate stream to an end user device via unicast. The method can include providing, by the system, a particular multi-bitrate stream of the multicast multi-bitrate streams to a group of set top boxes via multicast.

One embodiment of the subject disclosure includes a server having a processor and a memory that stores executable instructions that, when executed by the processor, facilitate performance of operations. The processor can receive, from a transcoder, multicast multi-bitrate streams that include segment and packaging information for media content, where the segment and packaging information includes fragment start and end boundary point markers for the media content. The processor can generate an adaptive bitrate stream for the media content according to the segment and packaging information. The processor can provide the adaptive bitrate stream to an end user device via unicast, where a particular multi-bitrate stream of the multicast multi-bitrate streams is provided by the transcoder to a group of set top boxes via multicast by bypassing the server.

One embodiment of the subject disclosure includes an end user device having a processor and a memory that stores executable instructions that, when executed by the processor, facilitate performance of operations. The processor can receive, via unicast from a server, an adaptive bitrate stream for media content, where the adaptive bitrate stream is generated by the server according to segment and packaging information that is received by the server from a transcoder in multicast multi-bitrate streams, where the segment and packaging information includes fragment start and end boundary point markers for the media content, and where a particular multi-bitrate stream of the multicast multi-bitrate streams is provided by the transcoder to a group of set top boxes via multicast by bypassing the server. The processor can present the media content and can present advertisements during the presenting of the media content according to advertisement insertion information included in the multicast multi-bitrate streams received by the server.

Figure 1:
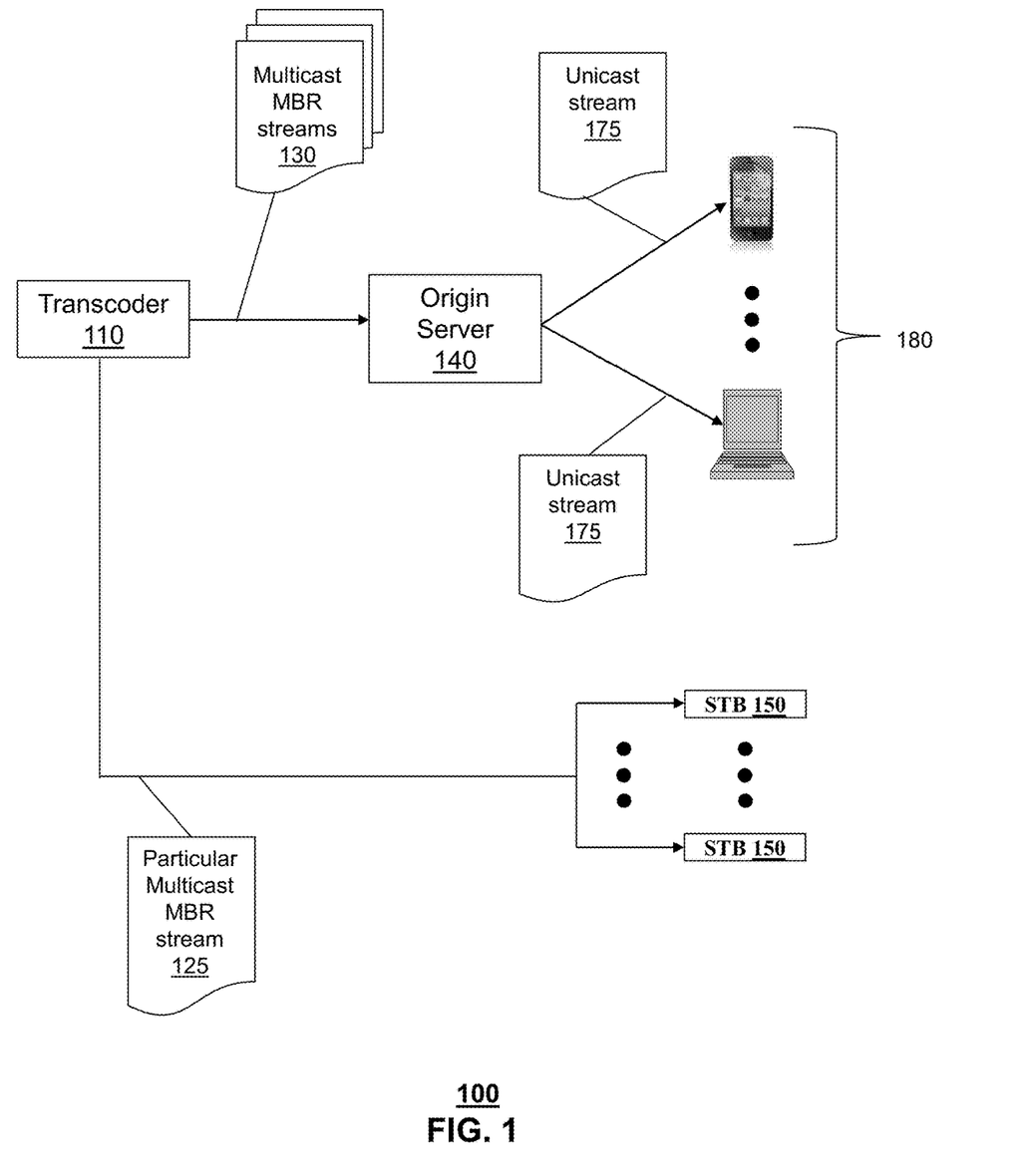
FIGS. 1 and 2 depict illustrative embodiments of systems that deliver media content utilizing segment and packaging information.

FIG. 1 depicts an illustrative embodiment of a system 100 that allows for delivery of media services to various communication devices through use of SPI. System 100 can include a transcoder 110 or other device that can generate or otherwise obtain transport streams for media content and can generate or otherwise obtain SPI for the media content. The SPI can be made up of various fields or elements including fragment start and end boundary point marker information for the media content, a chunk file name, advertisement markers that enable advertisement insertion in the media content, blackout markers that enable blackouts, and so forth. In one embodiment, the SPI can be generated to include information described in ISO/IEC 23009 MPEG-DASH published April 2012.

System 100 can include a server 140 for delivery of the media content to end user devices 180. In one embodiment, the server 140 can be an origin server. In one embodiment, the server 140 can be an edge device located at an edge of the network (e.g., a server that provides an entry point into a core network of a service provider). In one embodiment, the edge of the network can be located at an intermediate office or a central office of a service provider network. The end user devices 180 can be various types of devices including mobile phones, desktop computers, laptop computers, tablets, Personal Digital Assistants (PDAs), and so forth. The end user devices 180 can be mobile or fixed devices and can be wireless and/or wired devices.

Transcoder 110 can generate multicast MBR streams 130 for the media content for delivery to the server 140. The multicast MBR streams 130 can include or otherwise be provided in combination with the SPI that corresponds to the media content. The SPI can be included in the transport stream, in a separate transport stream and/or outside of the transport stream, such as in RTP header extensions. The MBR streams 130 can be multicast over the backbone of the network to the server 140 and can be processed by the server to extract the SPI (e.g., from the ingest transport stream or from the RTP header extension). In one embodiment, the server 140 can identify media fragment boundaries for the media content from the SPI (or from an RTP header extension), and can write the media fragment to a file whose name is also extracted from the SPI. For example, the resulting stream can be a DASH-TS, HLS, and/or HSS stream 175. DASH-TS, HLS, and/or HSS streams can each be unicast to end user devices 180, such as over the Internet and/or over the CDN.

In one embodiment, the transcoder 110 can also send one of the MBR streams 125 via multicast over an interactive television network (e.g., an IPTV, cable, and/or satellite network) to STBs 150 for interactive television service. In one embodiment, the particular multicast MBR stream 125 can be selected from amongst the group of multicast MBR streams 130 based on various criteria, such as based on a highest bitrate. However, other criteria can also be applied in the selection process for the particular multicast MBR stream 125 including present network conditions (e.g., traffic, jitter, latency, and so forth), predicted network conditions (e.g., predicted based on monitored history of network conditions), type of media content, geographic location of STBs 150 and so forth. In one embodiment, the multicast of the MBR stream 125 to the STBs 150 can bypass the server 140 while all of the MBR streams 130 are also multicast to the server 140. In one embodiment, the STBs 150 can receive but ignore the SPI in the MBR multicast stream 125 and can present the media content.

Figure 2:
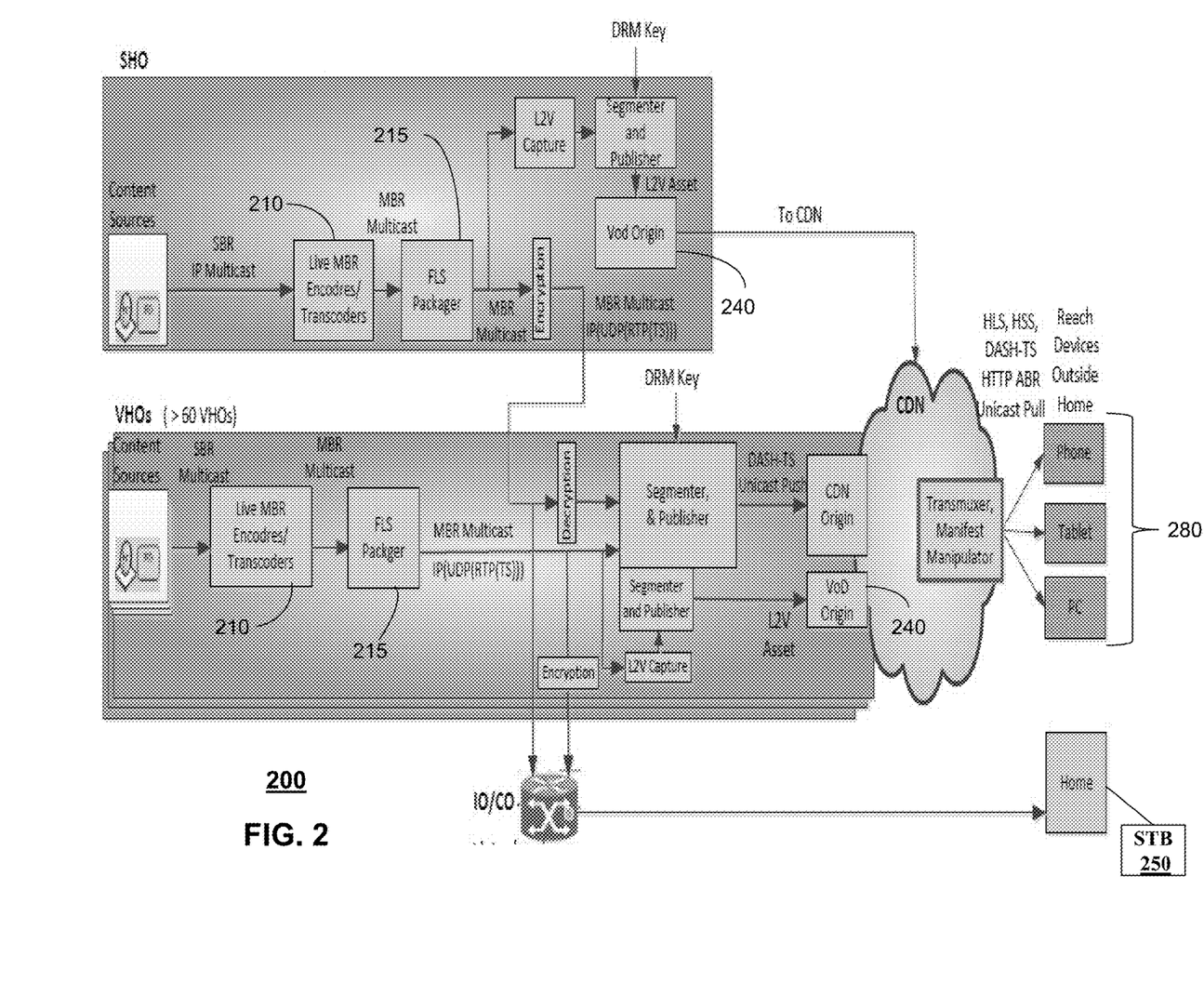

FIG. 2 depicts an illustrative embodiment of a system 200 that allows for delivery of media services to various communication devices through use of SPI. System 200 includes an exemplary Super Head-end Office (SHO) and an exemplary Video Head-end Office (VHO) of an interactive television network (e.g., an IPTV, cable and/or satellite) that include transcoders 210, as well as other devices, such as FLS packagers 215, however, other types of networks can also be used. System 200 enables delivery of streams to origin servers 240 and provides media services to various subscribers through STBs 250 (only one of which is shown) and end user devices 280.

In one embodiment, an audio-visual adaptive transport stream can be generated containing encoder boundary points, such as according to the CableLabs Encoder Boundary Point specification. SPI can be generated, such as in the transcoder 210 (e.g., according to ISO/IEC 23009 MPEG-DASH or other protocols such as related to HLS or HSS). The fragment start and end boundary point marker information can be included in the SPI. In one embodiment, a chunk file name can be included in the SPI. In one embodiment, the SPI can be converted into a stream of constant bit rate equal to (SPI size in bits/chunk duration) bits/sec. In one embodiment, the SPI can be packetized and can be added as a separate program with a different PID to the audio-visual transport stream. In one embodiment, a separate transport stream can be formed for the SPI. In one embodiment, the resultant transport stream can be packetized in RTP packets. In one embodiment, the RTP header can be extended and can include an SPI-present flag and fragment file size information in the RTP header extension. In one embodiment, the SPI can be embedded as a constant bit rate stream in the RTP header extension if the SPI-present flag is set.

In one embodiment, one of the FLS multicast MBR streams (e.g., the highest bit rate stream) can be provided by the transcoder 210 over the interactive network via multicast to STBs 250 for interactive television service and all of the FLS multicast MBR streams can be provided over the interactive television network backbone to the origin servers 240 in the edge of the network. In one embodiment, the origin servers 240 can extract or otherwise access the SPI from the ingest transport stream or from the RTP header extension, depending on the transport technique selected. The origin server 240 can identify media fragment boundaries from either the SPI or the RTP header extension, and can write the media fragment to a file whose name is extracted from the SPI. The resultant stream can be a DASH-TS, HLS, and/or HSS stream for the media content. The origin server 240 can then provide DASH-TS, HLS, and/or HSS streams via unicast over the CDN and/or Internet to the end user devices 280. In this embodiment, the STBs 250 may receive the SPI with the multicast MBR stream but can ignores the SPI and present the media content. Advertisement insertion information for the media content can be included with the multicast MBR stream(s) to enables advertisement insertion into the media content according to the advertisement insertion information, such as by the server 240, the STBs 250 and/or the end user devices 280.

In one embodiment, the packager 215 (e.g., an FLS packager) can ingest SPTS and MPTS. In one embodiment, the packager 215 can generate SPTS transport stream for SPTS ingest. In one embodiment, the packager 215 can generate MPTS transport stream for MPTS ingest. In one embodiment, the packager 215 can ingest multi-bitrate set of multicast transport streams compliant to ISO-13818-1 syntax over UDP/IP for each channel from the transcoder 210. In one embodiment, the packager 215 may not alter the input packetized elementary streams. In one embodiment, the packager 215 can generate transport streams compliant to ISO-13818-1 syntax. In one embodiment, the packager 215 may create and insert a new packetized elementary stream in the transport stream with FLS packaging data. In one embodiment, the packager 215 can insert fragment boundary-start markers in the transport streams based on the encoder boundary points and the specified chunk interval. In one embodiment, the packager 215 can insert fragment boundary-end markers in the transport streams based on the encoder boundary points and the specified chunk interval.

In one embodiment, the packager 215 can construct SPIs for the input set of MBR streams for each channel. In one embodiment, the packager 215 can detect the advertisement-markers in the input streams. In one embodiment, the packager 215 can insert the advertisement-markers in the SPI to enable SPI-based advertisement-insertion. In one embodiment, the packager 215 can embed the SPIs in the FLS packaging data. In one embodiment, each FLS packaged transport stream fragment can be wrapped into FLS packet.

In one embodiment, each FLS packet can have the following structure: {FLS-header, compressed SPI for the fragment, transport stream fragment}. In one embodiment, the FLS-Header can include the following fields: Type of fragment, Size of fragment, SPI-Present flag, offset to the beginning of the transport fragment, SPI encoding type. In one embodiment, each FLS packet can be multicast over RTP/UDP/IP in real time.

In one embodiment, system 200 allows for utilizing multicast in the backbone network to reduce bandwidth usage. In one embodiment, system 200 can maintain multicast all the way from the head-end (SHO) to the STBs 250 to improve quality of experience. In one embodiment, system 200 can provide a straight-forward extension of the existing interactive television services to the STBs 250 to the OTT-TV by adding the unicast only in the network-edge for OTT-TV. In one embodiment, system 200 can enable the SPI being located at a central location (e.g., at the content origin point in the SHO where transcoders are located) to provide for uniform packaging to DASH-TS, HLS, and/or HSS format at all network-edges. In one embodiment, system 200 can enable adding advertisement-insertion and/or blackout information in the transcoder in addition to or in place of the packager. In one embodiment, system 200 can utilize FLS creation that is a computationally inexpensive operation and can be implemented as a software add-on module in a transcoder. In one embodiment, system 200 can provide an FLS technique that eliminates a packager as a separate appliance, thereby reducing the number of components in the system and reducing the operational cost. In one embodiment, system 200 can enable hyper-targeted advertisement insertion in OTT devices and complex targeted advertisement insertion in STBs 250 by sending SPI along with the multicast transport streams so that the devices can utilize the SPI to create fragments of transport streams and insert manifest-based unicast advertisements. In one embodiment, system 200 can be implemented without introducing additional network components in the interactive television network from SHO to the residence which do not exist currently in existing interactive television service, thereby reducing operational and maintenance cost. In one embodiment, system 200 enables the FLS multicast streams that leave the transcoders in the SHO to be delivered unaltered to the STBs 250, thereby characterizing network issues and allowing for easier identification of network conditions. In one embodiment, system 200 can provide for delivery of media content that is standard compliant and can utilizes in whole or in part mature technologies such as transport stream and RTP encapsulation.

In one embodiment, system 200 provides improves backbone network bandwidth, reduces the cost of equipment, reduces operation and maintenance cost, improves advertising revenue, enables supporting only multicast traffic in the backbone instead of both multicast and unicast, improve scalability to number of consumers and types of devices by adding infrastructure only at the network edge, facilitates migration from current interactive television network to new services and easy fallback mechanism, and/or enables future services such as 4K-TV by implementing QoE policies and adaptive bit rate multicasting.

Figure 3:
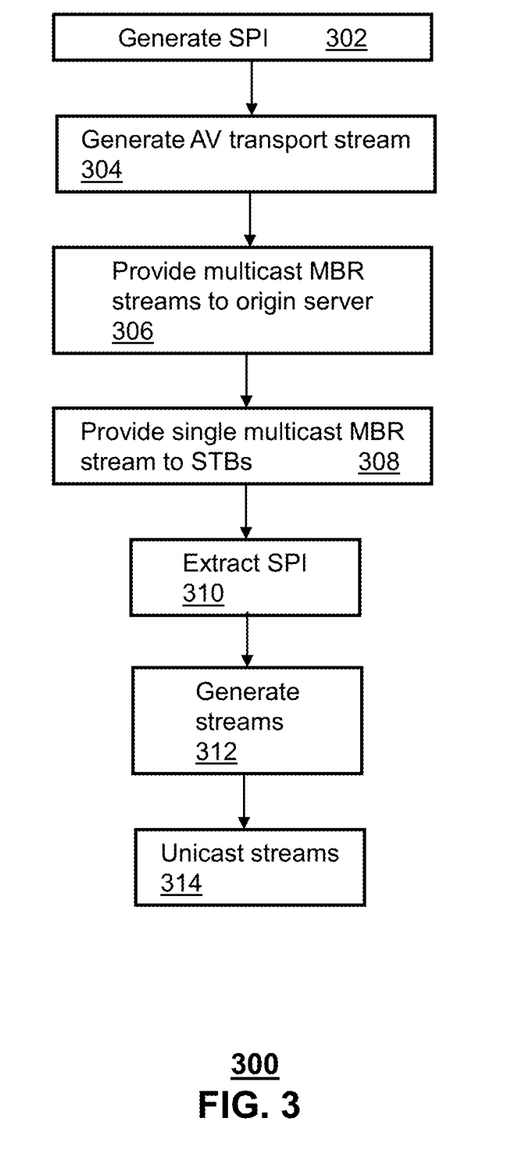
FIG. 3 depicts an illustrative embodiment of a method used in portions of the systems described in FIGS. 1 and 2.

FIG. 3 depicts an illustrative embodiment of a method 300 used by system 100 and/or 200 of FIGS. 1 and 2 for delivering media services to various devices including mobile and fixed devices, such as mobile phones and STBs. Method 300 can begin at 302 with SPI being generated for media content such as by transcoder 110. In one embodiment, the SPI includes fragment start and end boundary point markers for the media content. At 304 multicast MBR streams can be generated, such as by the transcoder 110, for delivery of the media content (e.g., via an AV transport stream) and the SPI. The SPI can be included in the transport stream, in a separate transport stream and/or outside of the transport stream, such as in RTP header extensions. At 306, the multicast MBR streams can be provided via multicast over the backbone of the network to a server (e.g., an origin server at the edge of the network). At 308, a particular MBR stream of the multicast MBR streams can also be provided, by the transcoder via multicast, to a group of set top boxes. In one embodiment, the particular MBR stream is selected from the MBR streams and then multicast to the group of set top boxes without multicasting or otherwise delivering the remaining (i.e., non-selected) MBR streams.

The server can extract or otherwise access the SPI from the multicast MBR streams at 310 and can generate adaptive bitrate stream(s) for the media content at 312 according to the SPI. At 314, the server can provide adaptive bitrate stream(s), via unicast, to end user device(s). In one embodiment, the providing of the particular MBR stream to the group of set top boxes bypasses the server. In one embodiment, the selecting of the particular MBR stream from among the multicast MBR streams is according to bitrate, such as a highest bitrate or a bitrate satisfying a bitrate threshold. In one embodiment, the generating of the multicast MBR streams can include embedding the SPI in a transport stream using a separate PID. In one embodiment, the generating of the multicast MBR streams includes generating an SPI program in a transport stream as a constant bit rate stream. In one embodiment, the generating of the multicast MBR streams includes providing at least some of the SPI in an RTP header extension. In one embodiment, the generating of the multicast MBR streams includes providing the SPI in a transport stream that is separate from an audio-visual transport stream for the media content.

In one embodiment, advertisement insertion information can be generated or otherwise obtained, such as by the transcoder, for the media content, where the providing of the multicast MBR streams to the server enables advertisement insertion into the media content according to the advertisement insertion information, such as by the server, by the STBs and/or by the end user devices. In one embodiment, the fragment start and end boundary point markers for the media content can be generated according to encoder boundary points and/or a specified chunk interval, where the encoder boundary points are included in an audio-visual transport stream for the media content. In one embodiment, the end user device(s) are mobile phones that enable voice communications, and the server is an origin server at a network edge.

Figure 4:
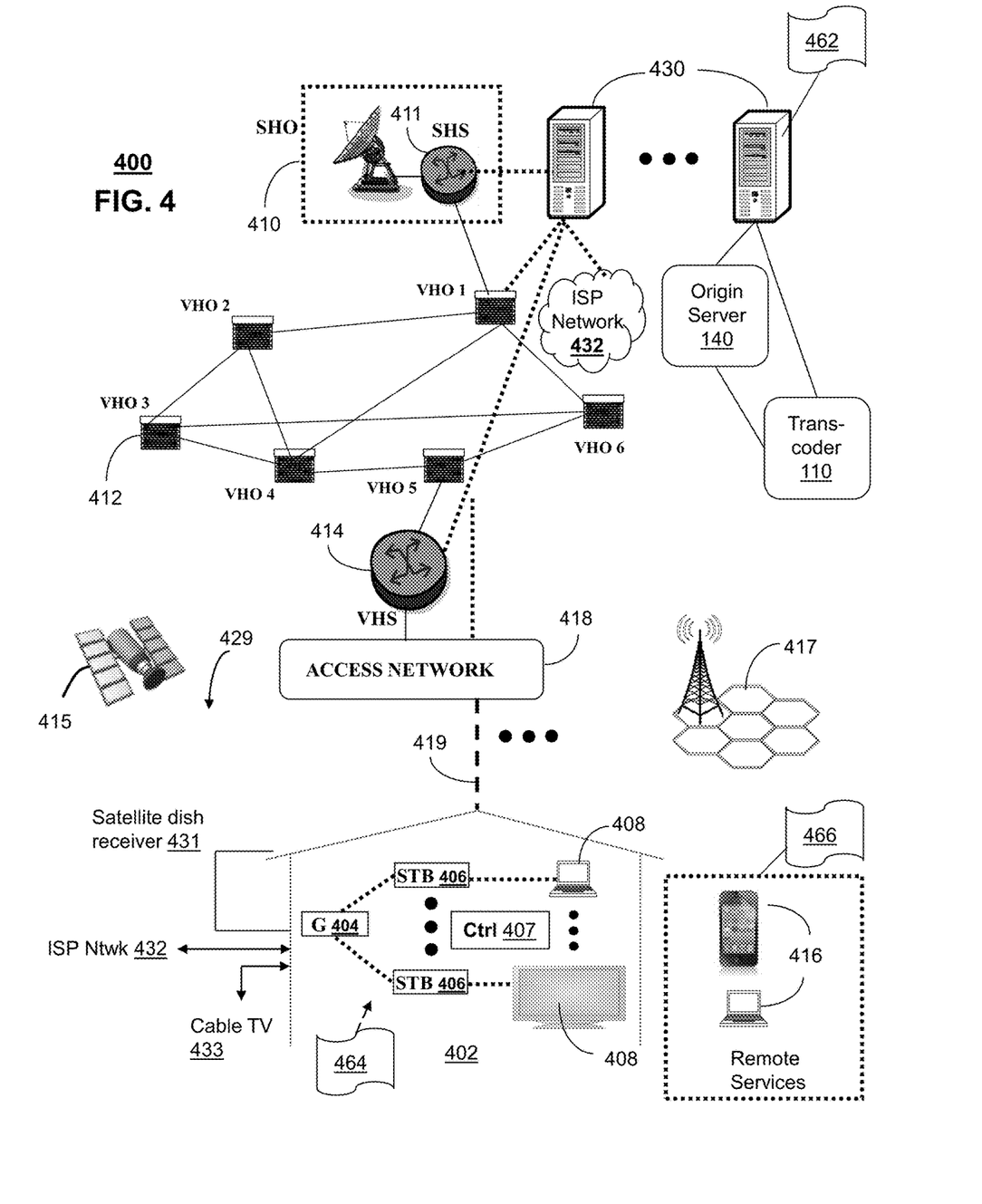
FIG. 4 depicts an illustrative embodiment of a communication system that provides media services including delivering media content utilizing segment and packaging information.

FIG. 4 depicts an illustrative embodiment of a communication system 400 for delivering media content by utilizing SPI, as well as without using the SPI. The communication system 400 can represent an IPTV media system, although other interactive systems can also be represented including cable and/or satellite. Communication system 400 can be overlaid or operably coupled with systems 100 and/or 200 of FIGS. 1 and/or 2 as another representative embodiment of communication system 400. For instance, one or more devices illustrated in the communication system 400 of FIG. 4 can receive multicast MBR streams that include SPI for media content, where the SPI includes fragment start and end boundary point markers for the media content. An adaptive bitrate stream can be generated by the one or more devices for the media content according to the SPI, and the adaptive bitrate stream can be provided to an end user device via unicast. In this example, a particular MBR stream of the multicast MBR streams can be provided by a transcoder to a group of set top boxes via multicast by bypassing an origin server. In one embodiment of system 400, the multicast MBR streams can include advertisement insertion information for the media content that enable advertisement insertion into the media content for presentation at the end user device according to the advertisement insertion information. In one embodiment of system 400, the SPI is embedded in the multicast MBR streams using a separate PID. In one embodiment, the multicast MBR streams can include SPI program having a constant bit rate stream. In one embodiment of system 400, at least some of the SPI can be provided in an RTP header extension. In one embodiment of system 400, the SPI can be received in a transport stream that is separate from an audio-visual transport stream for the media content. In one embodiment of system 400, the fragment start and end boundary point markers for the media content can be generated according to encoder boundary points and/or a specified chunk interval, where the encoder boundary points are included in an audio-visual transport stream for the media content.

The IPTV media system 400 can include an SHO 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of VHOs 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a FLS delivery server 430 (herein referred to as server 430). The server 430 can use computing and communication technology to perform function 462, which can include among other things, generating SPI (e.g., DASH-MPD, HLS, HSS-related information), embedding the SPI as a separate PID in a transport stream, creating a separate SPI program the transport stream as a constant bit rate stream, including some or all of the SPI in an RTP header extension outside of the transport stream, and/or transporting the SPI as a separate single program transport stream. Function 462 can also include identification of the chunk boundaries for the media content, and/or creating unicast DASH-TS, HLS, and/or HSS streams from FLS streams. For instance, function 462 of server 430 can be similar to the functions described for transcoder 110 or 210 and/or server 140 or 240 of FIGS. 1 and 2. Server 430 can interface with transcoder 110 and/or server 140 for performing one or more of the functions 462 and/or can have transcoder 110 and/or server 140 integrated therewith. The media processors 406 and wireless communication devices 416 can be provisioned with software functions 464 and 466, respectively, to utilize the services of server 430. For instance, functions 464 and 466 of media processors 406 and wireless communication devices 416 can be similar to the functions described for the communication devices 150, 180, 250 and/or 280 of FIGS. 1-2 and 4.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
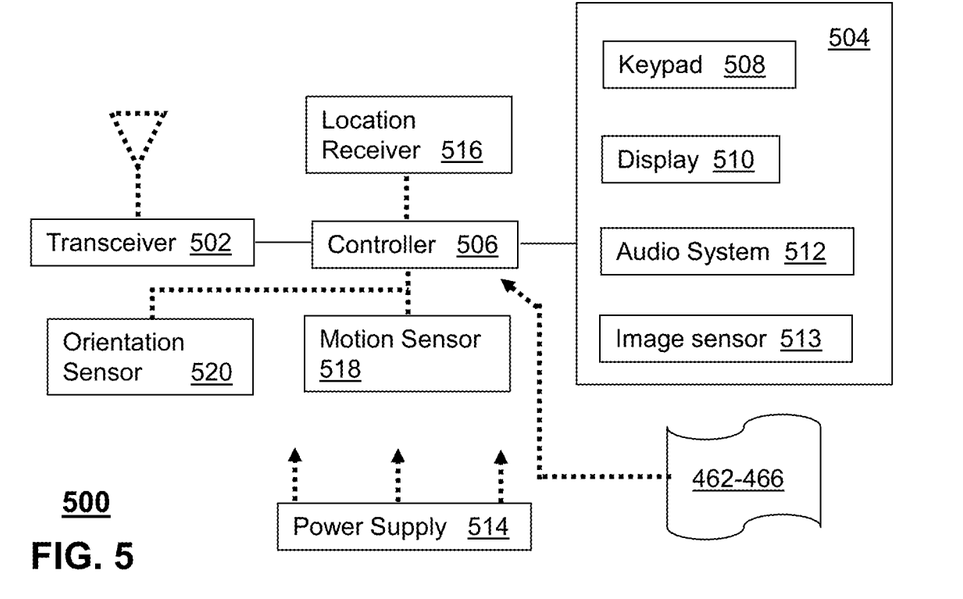
FIG. 5 depicts an illustrative embodiment of a communication device that can deliver and/or receive media content utilizing segment and packaging information.

FIG. 5 depicts an illustrative embodiment of a communication device 500. Communication device 500 can serve in whole or in part as an illustrative embodiment of the devices depicted in FIGS. 1 and/or 2, and FIG. 4, and can be configured to perform portions of method 300 of FIG. 3. For example, communication device 500 can be an end user device that receives, via unicast from a server, an ABR stream for media content, where the ABR stream is generated by the server according to SPI that is received by the server from a transcoder in multicast MBR streams, where the SPI includes fragment start and end boundary point markers for the media content, and where a particular MBR stream of the multicast MBR streams is provided by the transcoder to a group of set top boxes via multicast by bypassing the server. The device 500 can present the media content and can presenting advertisements during the presenting of the media content according to advertisement insertion information included in the multicast MBR streams received by the server.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of devices 110, 140, 150, 180, 210, 240, 250, 280 of FIGS. 1 and/or 2, the media processor 406, the media devices 408, and/or the portable communication devices 416 of FIG. 4. It will be appreciated that the communication device 500 can also represent other devices that can operate in systems 100 and 200 of FIGS. 1 and 2, and communication system 400 of FIG. 4 such as a gaming console or a media player. In addition, the controller 506 can be adapted in various embodiments to perform the functions 462-466, respectively.

Upon reviewing the aforementioned embodiments, it would be evident to an artisan with ordinary skill in the art that said embodiments can be modified, reduced, or enhanced without departing from the scope of the claims described below. For example, the networks can limit backbone traffic to multicast and utilize unicast traffic only for OTT delivery. In one embodiment, these limitations can be adjusted, such as allowing some unicast traffic on the network backbone, for instance, based on network conditions, prioritization of traffic, and so forth. Other embodiments can be used in the subject disclosure.

One or more of the exemplary embodiments provides for multicast video transmission, delivery and reception at set-top-boxes which provide a desired level of network QoS (e.g., minimal latency, jitter), faster packet loss/error recovery, improved network efficiency and real-time video delivery. One or more of the exemplary embodiments utilize unicast video transmission, delivery and reception for OTT services to end-user devices such as phones, tablets and PCs which can take advantage of the existing web-server infrastructure in the internet/CDN, to traverse network firewalls, and to work on un-managed end-user devices such as phones, tablets and PCs. The exemplary embodiments describe unicast delivery of DASH-TS, HLS, and/or HSS, but other unicast streaming protocols can be utilized such as HTTP live streaming (HLS), or smooth streaming (SS).

In one embodiment, interactive television (e.g., IPTV, cable and/or satellite) and OTT-TV services can be provided without building two separate systems. In one embodiment, interactive television (e.g., IPTV, cable and/or satellite) and OTT-TV services can be provided without modifying the STB clients to support unicast. In one embodiment, interactive television (e.g., IPTV, cable and/or satellite) and OTT-TV services can be provided without transmitting ABR unicast to the network-edge (e.g., Intermediate Offices or Central Offices) and/or without converting one of the unicast streams to a multicast stream to serve to STBs over the interactive television network and serving the unicast ABR streams unchanged to end-user devices over Internet/CDN.

In one embodiment, more than one of the multicast streams can be selected (e.g., according to a bitrate threshold) from among the MBR streams and transmitted over the interactive network to the STBs. For example, a first stream can be selected according to first criteria (e.g., a first bitrate threshold, a first location, first network traffic conditions, and so forth) from among the MBR streams at the transcoder and transmitted via multicast to a first set of STBs and a second stream can be selected according to second criteria (e.g., a second bitrate threshold, a second location, second network traffic conditions, and so forth) from among the MBR streams at the transcoder and transmitted via multicast to a second set of STBs.

In one embodiment, one or more of the generating of the SPI, the generating of the MBR streams, the selection of the particular MBR stream for multicast to the STBs and/or the generating of the ABR stream for unicast to the end user device(s) can be performed by devices other than or in addition to the transcoder, the packager and/or the origin server. For example, a segmenter and publisher server can take over one or more of these functions. In one embodiment, the packager 215 can be removed from the SHO and/or VHO. In one embodiment, the STB can be adjusted to include its own packager.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
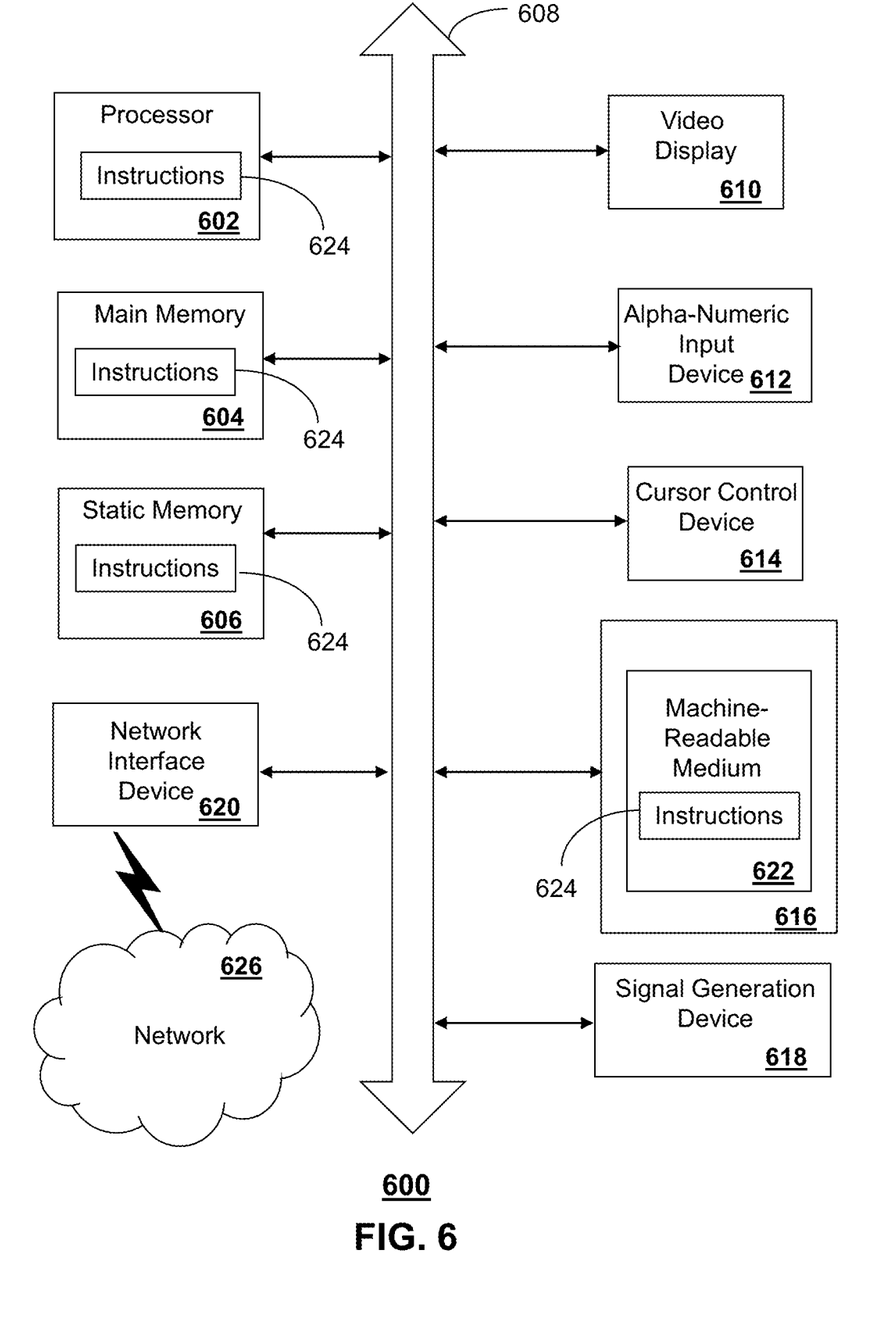
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the transcoders 110, 210, the servers 140, 240, the packager 215, the STBs 150, 250, the end user devices 180, 280, the server 430, the media processor 406, communication device 500 and other devices of FIGS. 1-2 and 4-5. System 600 can enable supporting both interactive television and OTT services through use of SPI. System 600 can enable transmitting MBR video multicast from a transcoder to a network edge or other network location. The multicast streams can then be converted to unicast ABR streams (e.g., at the edge) to serve end-user devices (e.g., mobile phones, personal computers, tablets, and so forth) over the Internet and/or over a CDN. In one or more embodiments, one of the multicast streams can be selected (e.g., according to a highest bit rate stream) and can be transmitted over the interactive network (e.g., IPTV, cable and/or satellite network) to media processors, such as STBs.

In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Figure 7:
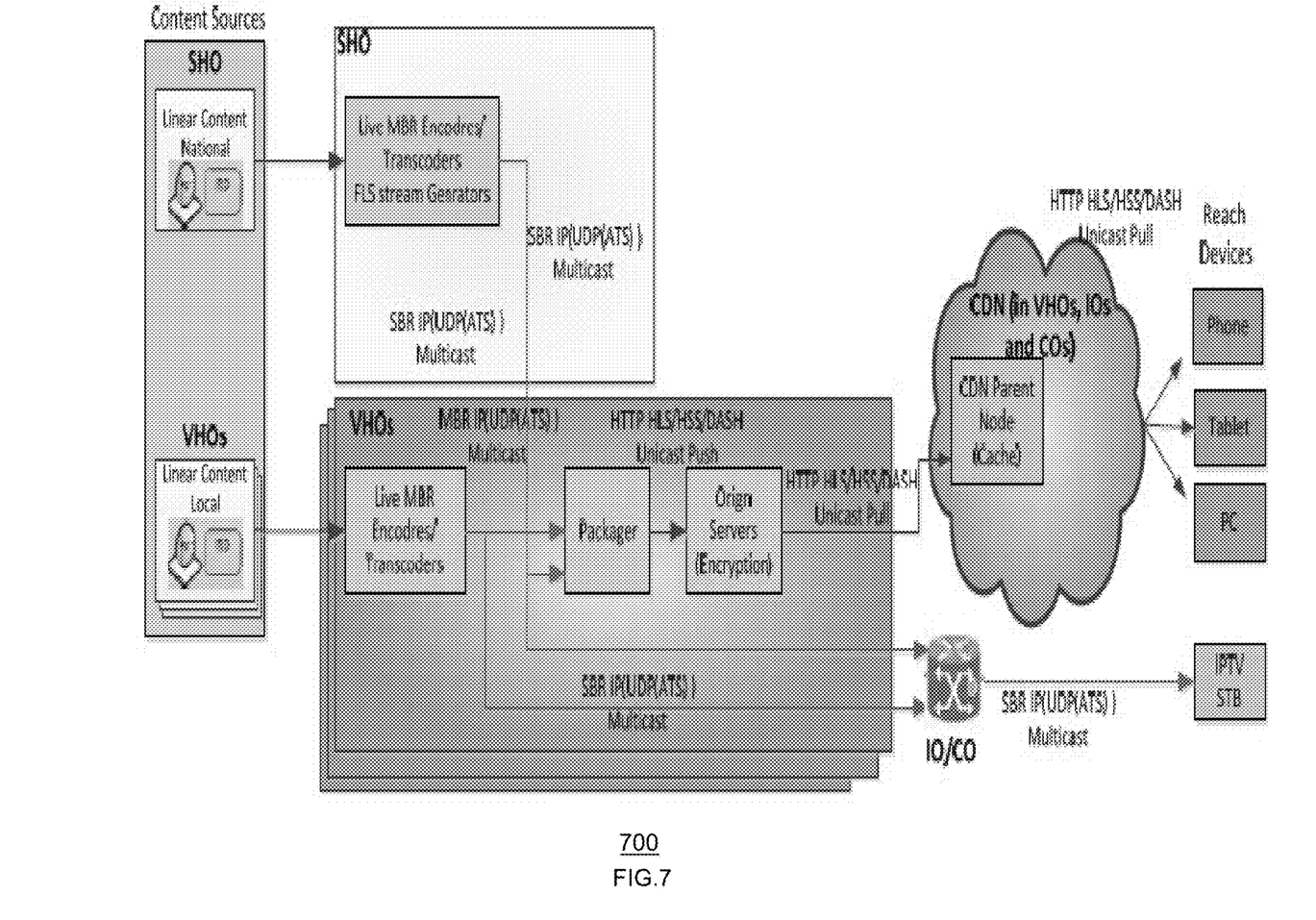
FIG. 7 depicts an illustrative embodiment of a communication system that provides media services including delivering media content utilizing segment and packaging.

Referring FIG. 7, a system 700 is illustrated which supports both interactive television and OTT-TV. The MBR transcoder can implement an FLS algorithm to generate output MBR Adaptive Transport streams (ATS). There may be no packager in the SHO. The MBR transcoder output streams from the SHO can be received by the packagers in all the VHOs. In other words, the multi bit rate video multicast can be transmitted to the network edge (e.g., typically VHOs or even the Intermediate Offices or Central Offices) and then, the multicast streams can be packaged to the unicast ABR streams at the edge to serve end-user devices (e.g., phones, PCs, tablets, and so forth) over Internet/CDN. One of the multicast streams (e.g., a highest bit rate stream) can be transmitted over the interactive television network to the STBs. In system 700, the streams can be multicast from the SHO to all VHOs unlike the unicast transmission in a typical network architecture—thus providing a savings in network data rate. For OTT-TV, all the streams (National channels and local channels) can be packaged in VHOs and streamed over CDN to the tablets, phones, PCs, and so forth. For interactive television service, the single bit rate (SBR) streams from the transcoders can be multicast to the STBs.

Transcoders can enable advertising and blackouts utilizing SCTE-35 and other industry standards. The transcoders can interface with industry standard advertising components such as placement opportunity information services (POIS) servers, schedulers, and so forth. Packaging formats are being still developed, and there is no single industry standard for packaging. System 700 enables implementing some or all of the advertisement and blackout related information generation and stream conditioning for both interactive television and OTT-TV in the transcoders and can avoid the work done in the transcoder for information generation and stream conditioning to be duplicated in the packager and thereby relieves the packager of this burden. System 700 can increase the packager's efficiency and scale for processing a larger number of streams. The FLS technique can centralize information generation and processing for advertising and black-outs in the transcoders.

Packagers can be remotely located in a different location away from the location of the transcoders. For example in system 700, more than 1000 national channels can be ingested and transcoded in a single location (i.e., SHO) and these national channels can be packaged in more than 60 VHOs. In other words, the packagers can be creating playlist/Manifest/MPD files and placing all the advertising and blackout information within these files in more than 60 locations for the same channel periodically at every few seconds. System 7000 can generate the playlist/Manifest/MPD files in the transcoders at a central location (e.g., the SHO) and can send these files to all the packagers (e.g., in more than 60 VHOs) to not only relieve the packagers from the burden of generating these files but also achieve the consistency of these files at every packager locations (e.g., in case packager software versions at each VHO do not match or packagers at all the VHOs are not from the same vendor). FLS techniques of the exemplary embodiments enable centralization of manifest/playlist/MPD creation and distribution. Both interactive television and OTT-TV system components and monitoring systems can be standard compliant. Therefore, any new techniques, such as the FLS described herein, for streaming can comply with the standards so that the components and monitoring systems need not be updated or replaced. The set-top-boxes in the interactive television system can receive the adaptive transport streams from the MBR transcoder. Any new technology that introduces new features in ATS can be backward compatible with the current set-top-box hardware. The FLS technique enables the FLS streams that are compliant to ATS to be demultiplexed and decoded by the existing interactive television set-top-box hardware with very minimal changes to the software if necessary.

Figure 8:
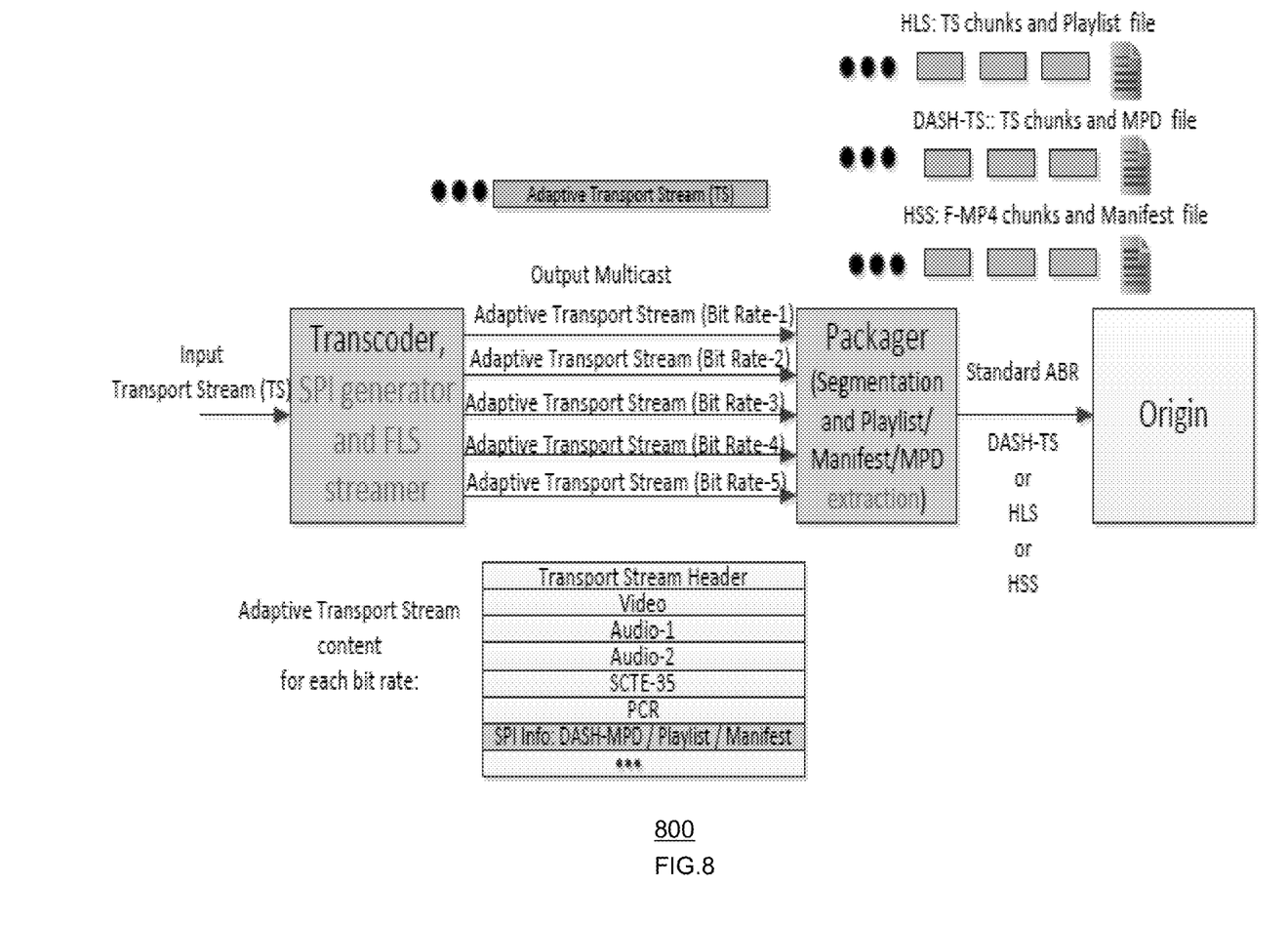
FIG. 8 depicts an illustrative embodiment of a communication system that utilizes fragment live streaming.

Referring to system 800 of FIG. 8, FLS can be utilized for delivering media services to various end user devices. The transcoder can generate the SPI and can send the SPI through output ATS multicast streams to the packager. The output ATS multicast streams containing SPI are the FLS streams. The SPI generated by the transcoder can contain all the information that a typical packager would have created such as media segment information, advertising information and blackout information, and so forth. The SPI may either be placed in a separate FLS file format, or it may be placed in one of the compliant manifest/playlist/MPD files, or may be a set of FLS, manifest, playlist and MPD files.

In system 800, the SPI can be sent to a packager in any one of the following four ways: (a) as an RTP header extension in every ATS RTP packets, (b) as separate RTP packets, (c) as a separate PID in each ATS stream, or (d) as a separate transport stream. In the case of (c) and (d), the SPI can be packetized into packetized elementary stream (PES) with PTS and DTS information matching the PTS/DTS of the corresponding instantaneous decoder refresh (IDR) frame in the video PES. The SPI can be in either text format or binary format. The SPI may be sent periodically at a desirable interval. Each time, either the whole SPI may be sent or only the incremental SPI may be sent. If the SPI is sent incrementally, it may be refreshed with the full information at a desirable interval. The SPI may be sent at a constant bit rate. The SPI may be losslessly compressed before sending using a compression algorithm. As a result of FLS technique, the packager functions become simplified especially for HLS and DASH-TS packaging where the segment file format is ATS. The packager may not be required to perform deep-inspection of ATS and may not be required to analyze, interpret and extract the advertising, blackout and any other packaging related information. Furthermore, the packager may not need to create a new manifest/playlist/MPD file. Instead, the packager can parse the high level elements in the input streams and obtain the SPI already existing in the form of manifest/playlist/MPD sent by the transcoder. Functions of the packager can include RTP de-packetization or PID filtering. In the case of interactive television service (e.g., IPTV, cable and/or satellite), the STB client can ignore the SPI in the input streams and can play video and audio. In other words, the STBs will be able to process the FLS streams. In addition, the STB clients can utilize the SPI in the FLS stream for advertisement insertion in the STB for targeted ad insertion. Thus, FLS enables STB-based highly targeted advertisement insertion in interactive television service. In one or more embodiments, the segment and packaging information can include splice-in and splice-out markers for insertion of advertisements by an end user device (e.g., a STB or a mobile phone) and/or blackout markers for providing blackouts to particular end user devices.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The exemplary embodiments can include one or more features described in MPEG Dynamic Adaptive Streaming over HTTP, Media Presentation Description and Segment Formats, MPEG-DASH, ISO/IEC DIS 23009-1:2012; Pantos, R., May, W., HTTP Live Streaming (HLS), IETF draft (June 2010) (e.g., found at http://tools.ietf.org/html/draft-pantos-http-live-streaming-04), December 2010; Encoder Boundary Point Specification, OpenCable Specifications, OC-SP-EBP-101-130118, January 2013; and Adaptive Transport Stream Specification, OpenCable Specifications, OC-SP-AT S-101-140214, February 2014, the disclosures of which are hereby incorporated by reference. The exemplary embodiments can also include one or more features described in Microsoft HTTP Smooth Streaming (HSS), http://www.iis.net/download/smoothstreaming, August 2011, the disclosures of which are hereby incorporated by reference.

What is claimed is:

1. A device, comprising:
 a processing system including a processor; and
 a memory that stores executable instructions that, when executed by the processing system, facilitate performance of operations, comprising:
 identifying a geographic location for each media processor of a group of media processors resulting in a plurality of geographic locations;
 identifying a network condition for a communication network based on traffic on the communication network;
 determining a bitrate threshold that is based on the network condition and the plurality of geographic locations;
 selecting a highest multi-bitrate stream from among multicast multi-bitrate streams according to the bitrate threshold; and
 providing the highest multi-bitrate stream of the multicast multi-bitrate streams to the group of media processors via multicast.

2. The device of claim 1, wherein the multicast multi-bitrate streams are for delivery of media content, and wherein the operations comprise generating segment and packaging information (SPI) for the media content.

3. The device of claim 2, wherein the operations comprise providing the multicast multi-bitrate streams to a network server for delivery of the media content and providing SPI for the media content to the network server.

4. The device of claim 3, wherein the network server accesses the SPI from the multicast multi-bitrate streams and generates an adaptive bitrate stream for the media content according to the SPI.

5. The device of claim 4, wherein the network server provides the adaptive bitrate stream to an end user device via unicast.

6. The device of claim 3, wherein the providing of the SPI comprises providing the SPI within a transport stream of the multicast multi-bitrate streams.

7. The device of claim 3, wherein the providing of the SPI comprises providing the SPI outside a transport stream of the multicast multi-bitrate streams.

8. The device of claim 3, wherein the providing of the SPI comprises providing the SPI within a real-time transport protocol (RTP) header extension.

9. The device of claim 1, wherein the multicast multi-bitrate streams are provided by a transcoder.

10. The device of claim 1, wherein the selecting of the highest multi-bitrate stream from among multicast multi-bitrate streams comprises selecting the highest multi-bitrate stream according to a bitrate of the highest multi-bitrate stream satisfying the bitrate threshold.

11. A non-transitory machine-readable storage medium, comprising executable instructions that, when executed by a processing system including a processor, facilitate performance of operations, comprising:
 determining predicted network conditions based on a monitored history of network conditions;
 selecting a highest multi-bitrate stream from among multicast multi-bitrate streams according to a threshold that is based on the predicted network conditions and a geographic location of each media processor of a group of media processors; and
 providing the highest multi-bitrate stream of the multicast multi-bitrate streams to the group of media processors via multicast.

12. The non-transitory machine-readable storage medium of claim 11, wherein the operations comprise providing the multicast multi-bitrate streams to a network server for delivery of media content and providing segment and packaging information (SPI) for the media content to the network server.

13. The non-transitory machine-readable storage medium of claim 12, wherein the network server accesses the SPI from the multicast multi-bitrate streams and generates an adaptive bitrate stream for the media content according to the SPI.

14. The non-transitory machine-readable storage medium of claim 13, wherein the network server provides the adaptive bitrate stream to an end user device via unicast.

15. The non-transitory machine-readable storage medium of claim 11, wherein the multicast multi-bitrate streams are provided by a transcoder.

16. The non-transitory machine-readable storage medium of claim 11, wherein the selecting of the highest multi-bitrate stream from among the multicast multi-bitrate streams comprises selecting the highest multi-bitrate stream according to a bitrate of the highest multi-bitrate stream satisfying the threshold.

17. A method, comprising:
 determining, by a processing system including a processor, predicted network conditions based on a monitored history of network conditions;
 selecting, by the processing system, a highest multi-bitrate stream from among a plurality of multi-bitrate streams according to the predicted network conditions and a geographic location of each media processor of a group of media processors; and
 providing, by the processing system, the highest multi-bitrate stream of the plurality of multi-bitrate streams to the group of media processors.

18. The method of claim 17, further comprising:
 providing, by the processing system, segment and packaging information (SPI) for media content to a network server.

19. The method of claim 18, wherein the network server accesses the SPI from the plurality of multi-bitrate streams and generates an adaptive bitrate stream for the media content according to the SPI.

20. The method of claim 19, wherein the network server provides the adaptive bitrate stream to an end user device via unicast, and wherein the providing of the highest multi-bitrate stream to the group of media processors is via multicast.

* * * * *